US 11,441,854 B2

(12) United States Patent
Rossignol et al.

(10) Patent No.: US 11,441,854 B2
(45) Date of Patent: Sep. 13, 2022

(54) HEAT EXCHANGER MADE OF PLASTIC MATERIAL AND VEHICLE INCLUDING THIS HEAT EXCHANGER

(71) Applicant: NOVARES France, Clamart (FR)

(72) Inventors: Vincent Rossignol, Lyons (FR); Gilles Waymel, Hulluch (FR); Jérôme Demangeot, Calonne sur la Lys (FR)

(73) Assignee: NOVARES FRANCE, Clamart (FR)

( * ) Notice: Subject to any disclaimer, the term of this patent is extended or adjusted under 35 U.S.C. 154(b) by 213 days.

(21) Appl. No.: 16/096,467

(22) PCT Filed: Apr. 21, 2017

(86) PCT No.: PCT/FR2017/050945
§ 371 (c)(1),
(2) Date: Oct. 25, 2018

(87) PCT Pub. No.: WO2017/187057
PCT Pub. Date: Nov. 2, 2017

(65) Prior Publication Data
US 2019/0120572 A1   Apr. 25, 2019

(30) Foreign Application Priority Data

Apr. 25, 2016 (FR) ..................................... 16/53647

(51) Int. Cl.
*F28F 21/06* (2006.01)
*F28F 3/04* (2006.01)
(Continued)

(52) U.S. Cl.
CPC ............ *F28F 21/065* (2013.01); *F28D 9/005* (2013.01); *F28D 9/0043* (2013.01);
(Continued)

(58) Field of Classification Search
CPC ......... F28F 21/065; F28F 3/04; F28D 9/0043; F28D 9/005; F28D 9/0056
See application file for complete search history.

(56) References Cited

U.S. PATENT DOCUMENTS 2,865,613 A * 12/1958 Egenwall ................ F28F 3/083
165/167
3,783,090 A * 1/1974 Andersson et al. ...... F28F 3/04
165/166
(Continued)

FOREIGN PATENT DOCUMENTS

| CN | 1328632 A | 12/2001 |
|----|-----------|---------|
| CN | 1993597 A | 7/2007 |

(Continued)

OTHER PUBLICATIONS

Chinese Office Action for Application No. 201780039627.X; dated Jan. 13, 2021.

(Continued)

*Primary Examiner* — Ljiljana V. Ciric
(74) *Attorney, Agent, or Firm* — Cantor Colburn LLP (57) ABSTRACT

A heat exchanger including a stack of plates spaced apart in such a way as to present an assembly of intermediate spaces allowing a fluid circulation between the plates. The assembly of intermediate spaces including a plurality of intermediate multi-fluid spaces each intended for circulation of a plurality of fluids between two adjacent plates, and each partitioned into a plurality of compartments separated from each other in a sealed manner. Each compartment is configured for the circulation of one fluid from the plurality of fluids, and is in fluid communication with one of the compartments of a distinct intermediate multi-fluid space.

20 Claims, 5 Drawing Sheets

(51) Int. Cl.
*F28D 9/00* (2006.01)
*B60H 1/00* (2006.01)

(52) U.S. Cl.
CPC .............. *F28D 9/0056* (2013.01); *F28F 3/04* (2013.01); *F28F 21/067* (2013.01); *B60H 1/00321* (2013.01)

(56) References Cited

U.S. PATENT DOCUMENTS

| | | | | |
|---|---|---|---|---|
| 4,470,453 | A * | 9/1984 | Laughlin | F28D 9/0012 165/DIG. 384 |
| 4,586,562 | A * | 5/1986 | Carlson | F28F 19/004 204/196.05 |
| 4,605,060 | A * | 8/1986 | Andersson | F28D 9/0037 165/146 |
| 4,744,414 | A * | 5/1988 | Schon | F28F 21/065 165/905 |
| 4,915,165 | A * | 4/1990 | Dahlgren | F28F 3/046 165/166 |
| 5,398,751 | A * | 3/1995 | Blomgren | F28F 3/046 165/166 |
| 5,531,269 | A * | 7/1996 | Dahlgren | F28D 9/005 165/167 |
| 5,544,703 | A * | 8/1996 | Joel | F28F 21/02 165/166 |
| 5,896,834 | A * | 4/1999 | Gruner | F28D 9/005 123/41.33 |
| 6,318,456 | B1 * | 11/2001 | Brenner | F28D 9/005 165/DIG. 373 |
| 6,325,276 | B1 * | 12/2001 | Kawano | B23K 1/0012 228/183 |
| 6,648,067 | B1 * | 11/2003 | Maute | F28F 21/065 165/166 |
| 6,959,492 | B1 | 11/2005 | Matsumoto et al. | |
| 7,866,379 | B2 | 1/2011 | Murayama et al. | |
| 9,228,784 | B2 * | 1/2016 | Reif | F28D 9/005 |
| 9,518,782 | B2 * | 12/2016 | Blomgren | F28F 3/046 |
| 11,253,958 | B2 * | 2/2022 | Rutkowski | B29C 65/3668 |
| 11,313,622 | B2 * | 4/2022 | Coutant | F28F 21/06 |
| 2002/0005279 | A1 * | 1/2002 | Maute | F28F 21/065 165/148 |
| 2003/0213580 | A1 * | 11/2003 | Philpott | F28F 21/065 165/46 |
| 2005/0178536 | A1 * | 8/2005 | Blomgren | B21D 53/04 165/167 |
| 2005/0269058 | A1 * | 12/2005 | Tagesson | F28F 3/10 165/70 |
| 2009/0151917 | A1 * | 6/2009 | Meschke | F28D 9/005 165/168 |
| 2009/0301700 | A1 * | 12/2009 | German | H01M 50/502 165/160 |
| 2009/0314480 | A1 * | 12/2009 | Grinbergs | H01M 8/04074 165/174 |
| 2010/0032148 | A1 | 2/2010 | Bermhult | |
| 2011/0209861 | A1 * | 9/2011 | Hayashi | B21D 13/02 165/185 |
| 2014/0050465 | A1 * | 2/2014 | Kominami | B60H 1/2225 392/482 |
| 2014/0345838 | A1 | 11/2014 | Vallee et al. | |
| 2016/0003128 | A1 | 1/2016 | Berger et al. | |
| 2017/0227295 | A1 * | 8/2017 | Kalbacher | F28F 9/0256 |
| 2017/0276434 | A1 * | 9/2017 | Kwon | F28D 9/0062 |
| 2018/0195431 | A1 * | 7/2018 | Yoo | F28D 9/0056 |
| 2018/0245858 | A1 * | 8/2018 | Dornseif | F28F 27/00 |
| 2018/0306520 | A1 * | 10/2018 | Kolder | F28F 9/0246 |
| 2018/0320980 | A1 * | 11/2018 | Coban | F01M 1/02 |
| 2018/0320988 | A1 * | 11/2018 | Johnson | F28D 21/0015 |
| 2019/0162111 | A1 * | 5/2019 | Rossignol | F02M 35/10268 |
| 2019/0257584 | A1 * | 8/2019 | Coutant | F28D 1/035 |
| 2022/0003505 | A1 * | 1/2022 | Strömer | F28D 9/0006 |

FOREIGN PATENT DOCUMENTS

| | | | | |
|---|---|---|---|---|
| CN | 101595361 | A | 12/2009 | |
| CN | 102445102 | A | 5/2012 | |
| CN | 103930742 | A | 7/2014 | |
| CN | 105466257 | A | 4/2016 | |
| DE | 10 2012 013 755 | A1 * | 1/2014 | |
| EP | 3 372 941 | A1 * | 9/2018 | |
| FR | 1529833 | | 6/1968 | |
| FR | 2993354 | A1 | 1/2014 | |
| FR | 3057655 | A1 * | 4/2018 | F28D 9/0056 |
| JP | H10170097 | A | 6/1998 | |
| JP | 2000304475 | A | 11/2000 | |
| JP | 20001021274 | A | 1/2001 | |
| JP | 2009133607 | A | 6/2009 | |
| JP | 2009192140 | A | 8/2009 | |
| JP | 2009228916 | A | 10/2009 | |
| JP | 2014214934 | A | 11/2014 | |
| WO | 2008063121 | A | 5/2008 | |
| WO | 2009013802 | A | 1/2009 | |
| WO | WO 2019/234015 | A1 * | 12/2019 | |

OTHER PUBLICATIONS

English Translation to Chinese Office Action for Application No. 201780039627.X; dated Jan. 13, 2021.
English Translation to Chinese Office Action for Application No. 201780039627.X; dated May 29, 2020.
English Translation to First Chinese Office Action for Application No. 201780039627.X; dated Dec. 17, 2019.
English Translation to International Search Report for Application No. PCT/FR2017/050945.
English Translation to Japanese Patent Application No. 2018-557030 Search Report dated Jan. 12, 2021.
First Chinese Office Action for Application No. 201780039627.X; dated Dec. 17, 2019.
First CN Search Report for Application No. 201780039627X.
Japanese Patent Application No. 2018-557030 Search Report dated Jan. 12, 2021.
Japanese Patent Application No. 2018-557030 Written Opinion.
Japanese Patent Application No. 2018-557030 Written Opinion (Translated).
Supplementary Search for CN Application No. 201780039627; dated Jan. 6, 2021.
Supplementary Search for CN Application No. 201780039627; dated May 23, 2020.
Written Opinion for Application No. PCT/FR2017/050945.
English Translation to Advisory Action for Japanese Patent Application No. 2018-557030; dated Jul. 6, 2021.
English Machine Translation FR1529833.
International Search Report for Application No. PCT/FR2017/050945.
Chinese Office Action for Application No. 201780039627.X; dated May 29, 2020.
English Translation to JP Office Action Patent Application No. 2018-557030; dated Jan. 18, 2021.

* cited by examiner

HEAT EXCHANGER MADE OF PLASTIC MATERIAL AND VEHICLE INCLUDING THIS HEAT EXCHANGER

CROSS REFERENCE TO RELATED APPLICATIONS

This application is a National Stage of PCT Application No. PCT/FR2017/050945 filed on Apr. 21, 2017, which claims priority to French patent application Ser. No. 16/53647 filed on Apr. 25, 2016, the contents each of which are incorporated herein by reference thereto.

TECHNICAL FIELD

The present invention concerns a heat exchanger, and a vehicle comprising this heat exchanger.

BACKGROUND

The plate heat exchangers traditionally comprise several stacked aluminum plates so as to form an intermediate space between the adjacent plates intended for the circulation of a fluid. Conventionally, the heat exchangers comprise a first group of intermediate spaces fluidly connected to each other for the circulation of a first fluid through the stack of plates, and a second group of intermediate spaces fluidly connected to each other for the circulation of a second fluid through the stack of plates. The intermediate spaces of the first group conventionally alternate with the intermediate spaces of the second group, so as to enable a heat exchange between the first fluid and the second fluid, in the stacking direction.

However, a drawback of these heat exchangers is a relatively significant bulk, in particular due to the alternation of intermediate spaces dedicated to a first fluid and of spaces dedicated to a second fluid.

In addition, the efficiency is relatively limited. The heat exchange is actually made only in a direction orthogonal to the plates, that is to say, from an intermediate space to the other of the heat exchanger.

Moreover, aluminum heat exchangers are relatively bulky. Their parallelepipedal shape is a constraint to the integration of these exchangers in a complex environment, and does not allow an optimum heat transfer efficiency of a part or a subset due to the only partial occupation by the exchanger of the volume in which it may be positioned.

BRIEF SUMMARY

Also, the present invention aims at overcoming all or part of these drawbacks by proposing a heat exchanger offering an improved compactness for an equivalent efficiency, or an improved efficiency for an equivalent compactness.

To this end, the object of the present invention is a heat exchanger, made of plastic material, comprising a stack of plates, whose adjacent plates are spaced from each other such that the stack of plates has a set of intermediate spaces enabling a fluid circulation between these plates, characterized in that the set of intermediate spaces comprises a plurality of multi-fluid intermediate spaces, each multi-fluid intermediate space being intended for the circulation of several fluids between two adjacent plates of the stack of plates, each of said multi-fluid intermediate spaces being partitioned into several compartments, tightly separated from each other, each compartment being configured for the circulation of one fluid among the plurality of fluids, and each compartment being in fluid communication with one of the compartments of a distinct multi-fluid intermediate space among the plurality of multi-fluid intermediate spaces.

Thus, the heat exchanger allows a circulation of several fluids within the same intermediate space, such that the heat exchanger has an improved compactness and a better efficiency. In addition, the heat exchanger is made of plastic material and consequently offers the possibility of having a shape adapted to the volume in which the exchanger is intended to be positioned, such that efficiency may be improved without increasing bulk. Thus, an exchanger made of plastic material offers a freedom of shape which allows overcoming the constraints usually related to the parallelepipedal shape of aluminum heat exchangers.

According to a preferred embodiment, each multi-fluid intermediate space comprises an inner wall extending therethrough so as to tightly separate at least two adjacent compartments of this multi-fluid intermediate space, and the inner wall is configured to enable a heat exchange between the fluids circulating in these at least two adjacent compartments.

An advantage of this feature is an improvement in the efficiency, because the heat exchange is multi-directional and occurs between two intermediate spaces as well as between two compartments of the same multi-fluid intermediate space.

According to a preferred embodiment, the inner wall extends at least partially according to a sinuous trajectory. This trajectory may be angular, in particular in a zigzag or crenellated fashion, or curved, for example S-shaped or sinuous trajectory.

Thus, this feature allows maximizing the transverse heat exchange surface, that is to say between the fluids circulating in the two compartments of the same multi-fluid intermediate space. Therefore, this improves the efficiency.

According to a preferred embodiment, the inner wall is integrally molded with at least one of the two adjacent plates between which this inner wall extends.

This allows reducing costs.

According to a preferred embodiment, the inner wall is linked to at least one of the two adjacent plates by a sealed and thermally conductive linking element.

This feature improves the efficiency.

According to a preferred embodiment, the inner wall has a thickness smaller than that of the plates between which this inner wall extends.

This promotes the intra-intermediate space heat exchange, and therefore contributes to a better efficiency.

According to a preferred embodiment, the inner walls of two consecutive multi-fluid intermediate spaces extend offset from each other.

In other words, from a multi-fluid intermediate space to another, the compartments intended for the circulation of the same fluid are not, or partially, superimposed. For example, the compartments of two consecutive multi-fluid intermediate spaces have different shapes or are offset, at least partially, in the plane of the plates, such that a heat exchange takes place both horizontally between the fluids circulating in adjacent compartments of the same multi-fluid intermediate space and vertically through the plates, between the fluids circulating in adjacent intermediate spaces.

Thus, there is one or more overlapping area(s) between the compartments of two consecutive multi-fluid intermediate spaces. This overlap contributes to create more thermal interface, therefore to improve the compactness and the bulk.

This possibility of varied shape of the compartments is allowed in particular by using plastic material.

According to a preferred embodiment, several plates of the stack of plates have different thickness and/or density.

This feature advantageously allows creating a predetermined thermal gradient within the stack of plates by promoting the heat transfer among one or several group(s) of plates, that is to say at one or more predetermined location(s) of the stack of plates.

According to a preferred embodiment, the compartments of each multi-fluid intermediate space are at least partially defined by faces opposite the two adjacent plates delimiting this multi-fluid intermediate space.

Thus, each compartment of a multi-fluid intermediate space offers a heat exchange interface enabling a vertical heat exchange, that is to say inter-intermediate space heat exchange, on each side of this multi-fluid intermediate space towards the two intermediate spaces which are adjacent thereto, and a horizontal or transverse heat exchange, that is to say intra-intermediate space heat exchange, with one or several other compartment(s) of this multi-fluid intermediate space.

According to a preferred embodiment, at least one of the compartments comprises a plurality of elements intended to hinder the fluid flow in this compartment, and the elements are thermally conductive.

Thus, these elements improve the efficiency, on the one hand, by forming an obstacle to the fluid circulation and therefore by causing a turbulent flow promoting the heat exchange, and, on the other hand, by enlarging the thermal interface between the fluid and the compartment.

According to another aspect, the object of the invention is also a vehicle comprising a heat exchanger having the aforementioned features.

This vehicle offers a possibility of heat exchange with an improved efficiency, a larger place available thanks to the compactness of the heat exchanger, and the freedom of shape offered by the plastic material.

The heat exchanger allows using several fluids to cool down or heat up one or several other fluid(s), which is advantageous in terms of efficiency, because depending on the operating speed of a vehicle, some fluids are more suitable for cooling or heating one or several other fluid(s).

BRIEF DESCRIPTION OF THE DRAWINGS

Other features and advantages of the present invention will clearly come out from the detailed description hereinafter of an embodiment, given as a non-limiting example, with reference to the appended drawings in which.

DETAILED DESCRIPTION

Figure 1:
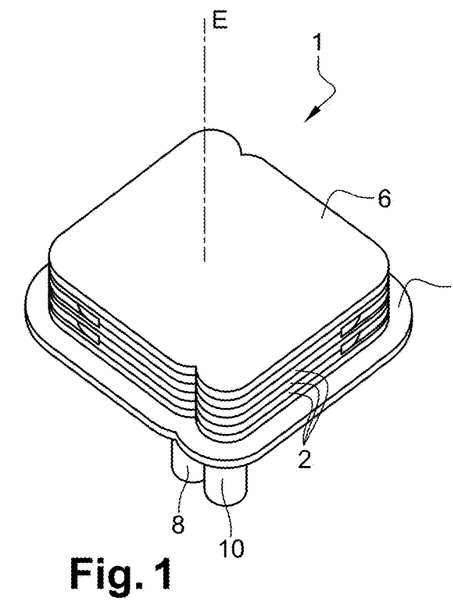
FIG. 1 is a perspective view of a heat exchanger according to an embodiment of the invention.
Figure 6:
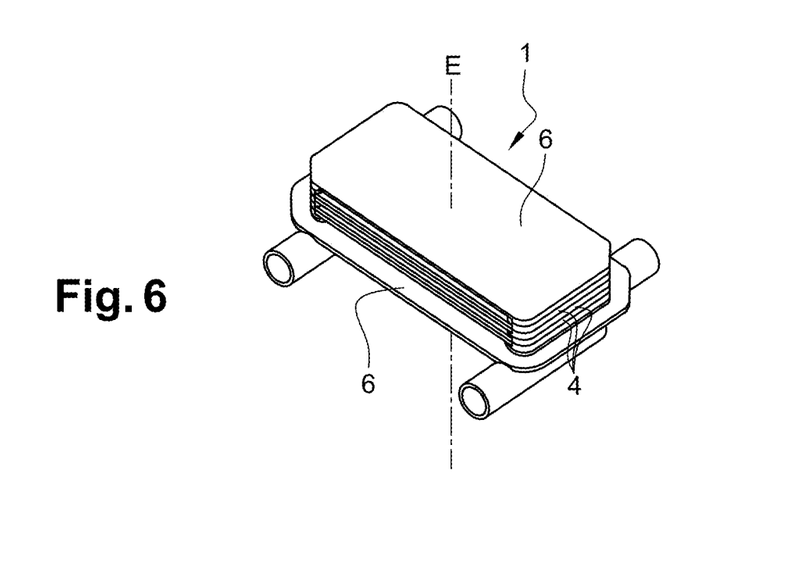
FIG. 6 is a perspective view of a heat exchanger according to an embodiment of the invention.

FIGS. 1 and 6 show a heat exchanger 1 according to embodiments of the invention.

The heat exchanger 1 is a plate-type heat exchanger. The heat exchanger 1 comprises a plurality of plates 2 stacked in a stacking direction E. The adjacent plates 2 are distant from each other, so as to define, between each pair of adjacent plates 2, an intermediate space 4 intended for a fluid circulation within the heat exchanger 1.

The plates 2 are configured to enable a heat exchange therethrough, that is to say from an intermediate space 4 to an adjacent intermediate space 4.

Figure 3:
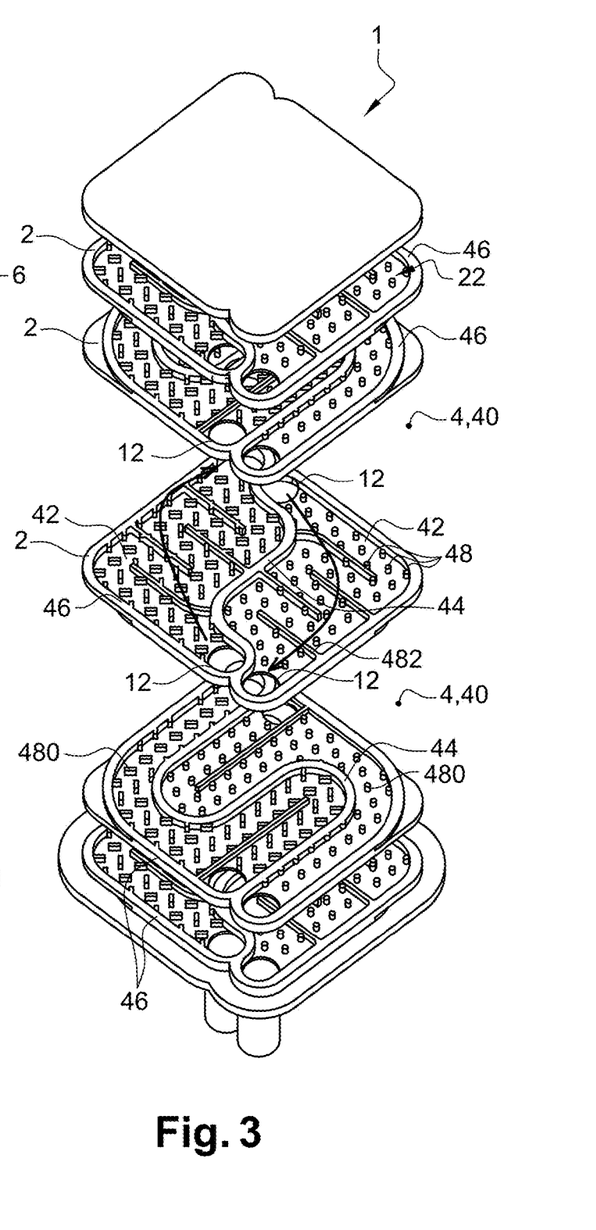
FIG. 3 is an exploded and perspective view of the heat exchanger of FIG. 1.
Figure 8:
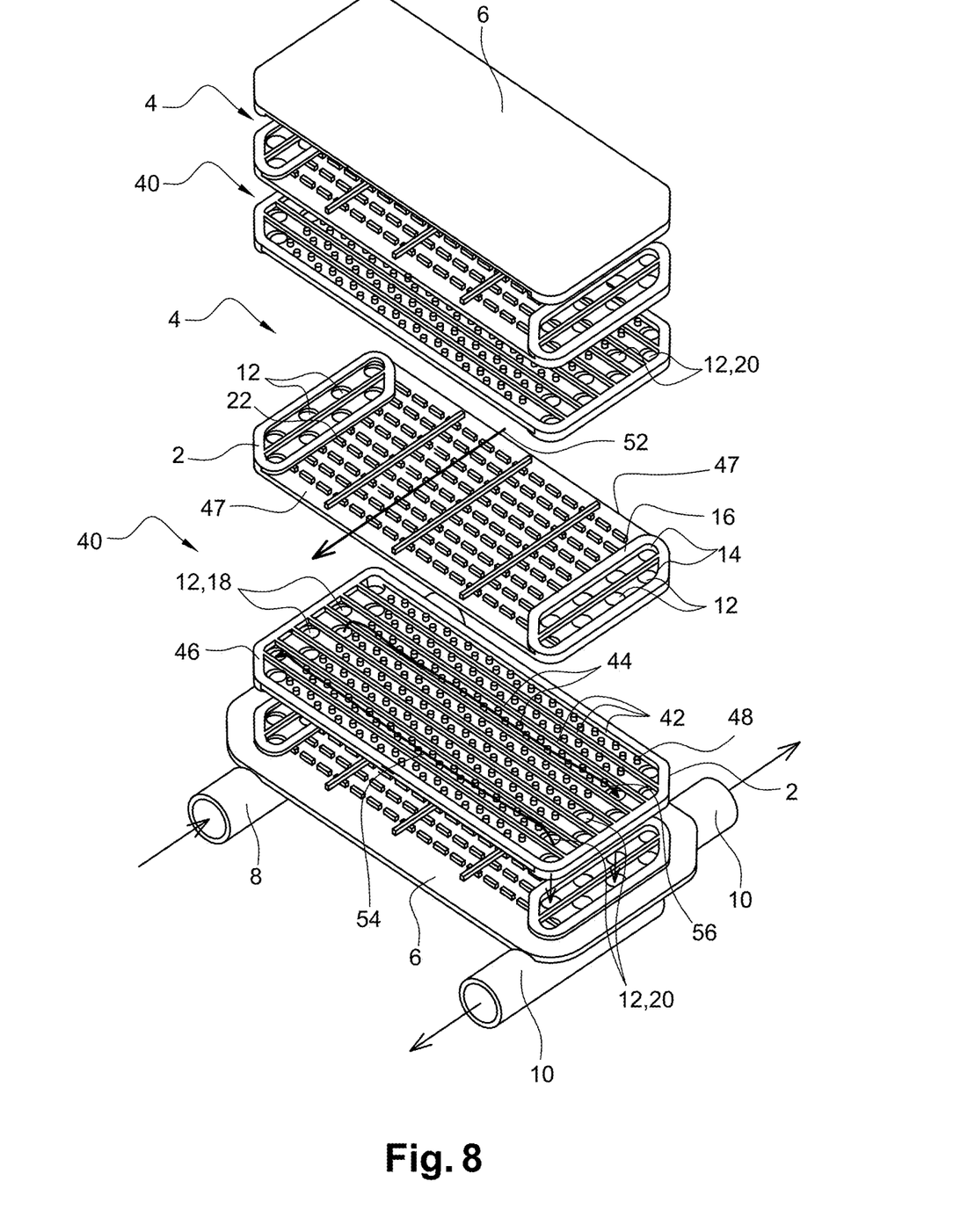
FIG. 8 is an exploded and perspective view of the heat exchanger of FIG. 6.

The intermediate spaces 4 may be closed, as illustrated in FIGS. 3 and 8, or open, as illustrated in FIG. 8. The closed intermediate spaces 4 have an outer wall 46 with a closed contour, which herein extends at the edge of the plates 2, between two adjacent plates 2, so as to delimit a closed volume. The open intermediate spaces 4 have at least two lateral openings 47, delimited for example by the edges opposite two adjacent plates 2, and for example, located at opposite sides of these plates 2 in order to enable a fluid circulation from outside the heat exchanger 1 and throughout the stack of plates 2.

The stacking direction E is herein substantially orthogonal to the plates 2. Moreover, the plates 2 may be planar as illustrated in the figures. The plates 2 may be of the same shape and of the same dimensions, such that once stacked, the outer edges of the plates 2 coincide.

The heat exchanger 1 may comprise two end plates 6, the stack of plates 2 being interposed between these two end plates 6.

The heat exchanger 1 herein comprises inlets 8 each intended for the introduction of one fluid inside the heat exchanger 1, and outlets 10 intended for the evacuation of these fluids out of the heat exchanger 1. The inlets 8 and/or the outlets 10 may be formed through one or all of the end plate(s) 6.

The heat exchanger 1 comprises in particular a plurality of openings 12 configured to enable a fluid circulation from an intermediate space 4 to another. The openings 12 may be formed through the plates 2.

The heat exchanger 1 may comprise dispensing channels 14 extending through the stack of plates 2, so as to connect several openings 6 to each other. Each dispensing channel 8 is thus intended to conduct a fluid from one of the inlets 8 to predetermined intermediate spaces 4, via openings 12, or from these predetermined intermediate spaces 4 to one of the outlets 10, via openings 12. The dispensing channels 14 extend for example in the stacking direction E. The dispensing channels 14 may be formed by a peripheral wall 16 extending between two adjacent plates 2, around one of the openings 12 or a group of openings 12.

The heat exchanger 1 is made of plastic material, in particular a plastic material containing a thermally conductive charge, such as, for example, polyamide 66 (PA66) including a graphite and/or carbon charge, to provide a thermal conductivity at 20° C. higher than 0.6 $W \cdot m^{-1} \cdot K^{-1}$, preferably equal to or higher than 1 $W \cdot m^{-1} \cdot K^{-1}$.

It should be noted that the plates 2 may have a thickness or a density different from each other, for example increasing or decreasing in the stacking direction E, so as to create a predetermined heat exchange gradient within the stack of plates 2.

Among the set of intermediate spaces 4, the stack of plates 2 has an array of multi-fluid intermediate spaces 40, that is to say a plurality of multi-fluid intermediate spaces 40 connected to each other in a fluidic manner, in particular via openings 12 and, where appropriate, dispensing channels 14.

Each multi-fluid intermediate space 40 is configured to enable the circulation of several fluid flows between the adjacent plates 2 which delimit it.

It should be noted that the fluids circulating through each intermediate space 40 may be identical or different. In all cases, these fluids circulate separately through the multi-fluid intermediate spaces 40.

Indeed, each multi-fluid intermediate space 40 comprises several compartments 42, tightly separated from each other, such that there is no fluid communication between the compartments 42 of the same multi-fluid intermediate space 40.

Thus, each compartment 42 is dedicated to the circulation of a single fluid among the plurality of fluids intended to circulate through the array of multi-fluid intermediate spaces 40.

According to the example of FIG. 3, each of the intermediate spaces 40 comprises two compartments 42. According to the example of FIG. 8, each of the multi-fluid intermediate spaces 40 comprises eight compartments 42.

Each compartment 42 is fluidly connected with at least one of the compartments 42 of one of the other multi-fluid intermediate spaces 40.

To this end, the heat exchanger 1 comprises, for each compartment 42, an inlet opening 18 and an outlet opening 20 each opening into this compartment 42 in order to respectively enable the inlet and the outlet of a fluid for this compartment 42.

The inlet and outlet openings 18, 20 may be formed through the dispensing channels 14, in particular through the peripheral wall 20 of distinct dispensing channels 14, or else where appropriate, through the plates 2 while being combined to the openings 12. According to the example of the figures, the inlet openings 18 consist of openings 12 fluidly connected to an inlet 8, and the outlet openings 20 consist of openings 12 fluidly connected to an outlet 10.

As illustrated in the Figures, the openings 12, and more specifically the inlet openings 18, respectively the outlet openings 20, are coaxial.

The inlet and outlet openings 18, 20 of the same compartment 14 are distinct, positioned at a distance from each other, and offset in a direction parallel to the plates 2, that is to say non-coaxial.

It should be noted that the compartments 14 are configured to enable a flow of fluids parallel to each other, that is to say substantially in the same flow plane parallel to the plates 2, from the corresponding inlet opening 18 to the corresponding outlet opening 20.

Each multi-fluid intermediate space 40 comprises one or several inner wall(s) 44 extending therethrough so as to tightly separate two adjacent compartments 42. The inner wall(s) 44 may be formed by a longitudinal rib joining the faces 22 opposite the two adjacent plates 2, distinct, where appropriate, from the peripheral wall(s) 16. Moreover, each of the ends of this longitudinal rib may be joined to the outer wall 46.

Thus, the compartments 42 may form a closed volume delimited by one or more inner wall(s) 44, a portion of the faces 22 opposite the two adjacent plates 2, and a portion of the outer wall 46.

It should be noted that the inner wall(s) 44 of a multi-fluid intermediate space 40 are advantageously configured to enable a heat exchange between the fluids circulating in two adjacent compartments 42.

Thus, it is important to note that the heat exchanger 1 offers both an inter-plates 2 heat exchange, in the stacking direction E, that is to say from an intermediate space 4 to an adjacent intermediate space 4, and an intra-plates heat exchange, in a plane parallel to the plates 2, that is to say within the same intermediate space 4 when the latter is a multi-fluid intermediate space 40. These multiple heat exchange flows improve the efficiency and the compactness of the heat exchanger 1.

The ribs forming the inner walls 44 preferably have a thickness smaller than that of the plates 2 between which they extend, and where appropriate smaller than the thickness of the rib forming the outer wall 46, in order to facilitate this heat exchange.

Advantageously, each compartment 42 comprises a plurality of elements 48 forming an obstacle to the fluid flow. These elements 48 are preferably made of a thermally conductive material in order to substantially enlarge the heat exchange interface and improve efficiency. The elements 48 extend between the faces 22 opposite the adjacent plates 2, from one of these faces 22, without necessarily being linked to the other one of these faces 22.

The elements 48 may comprise pins 480 intended to promote a turbulent fluid flow in order to increase the efficiency of the heat transfer.

The elements 48 may comprise ribs 482, in particular arranged relative to each other so as to form baffles increasing the length of the fluid path in the compartment 42, between the inlet opening 18 and the outlet opening 20. In order to maximize the path of the fluid, the inlet opening 18 and the outlet opening 20 are positioned at the opposite ends of a fluid circulation circuit delimited inside the compartment 14. The ribs 482 may have an end secured to the or one of the inner walls 44 or the outer wall 46 and a free opposite end.

In particular, the inner wall(s) and, where appropriate, the elements 48, may advantageously be made of the same material as the plates 2, in particular of polyamide 66 (PA66) including a thermally conductive charge such as graphite or carbon.

Preferably, the inner wall(s) 44 are integrally molded with the plates 2 to which they are secured, as well as, where appropriate, the elements 48 and/or the outer wall 46.

It should be noted that each inner wall 44 secured to one of the two adjacent plates 2 is preferably linked to the other one of the two adjacent plates 2, in particular to the face 22 (FIG. 3) or to the or one of the inner walls 44 of this plate 2 (FIG. 9), by a linking element enabling a tight and thermally conductive connection. For example, the linking element may be a welding bead 50; thus, the inner walls 44 are preferably welded to at least one of the two adjacent plates 2. Indeed, the welding ensures a continuity of material and therefore an absence of any thermal break at the interface between the inner walls 44 and the corresponding plate(s) 2.

The inner wall(s) 44 may extend in a rectilinear manner, as illustrated in FIG. 8. Nonetheless, the inner wall(s) 44 preferably extend in a non-exclusively rectilinear manner. Thus, the inner wall(s) 44 may extend in particular in a curvilinear manner, for example in a corrugated manner, in an S or sinusoidal fashion, as shown in FIG. 3. This allows increasing the heat exchange surface between two adjacent compartments 42. When the multi-fluid intermediate space 40 comprises several inner walls 44, these may be parallel to each other.

Figure 4:
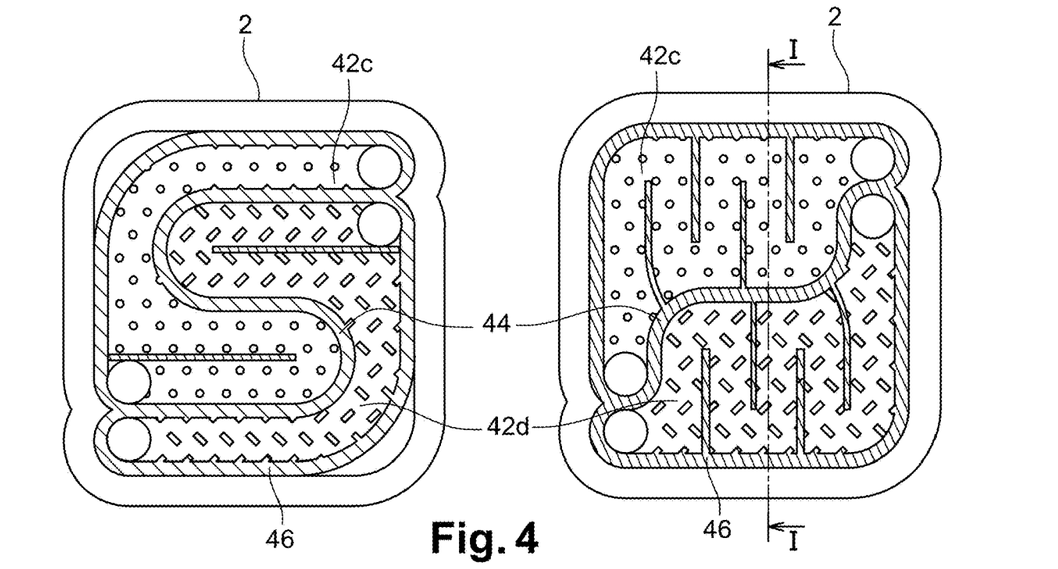
FIG. 4 is a top view of two consecutive plates of the stack of plates of an exchanger according to an embodiment of the invention.
Figure 5:
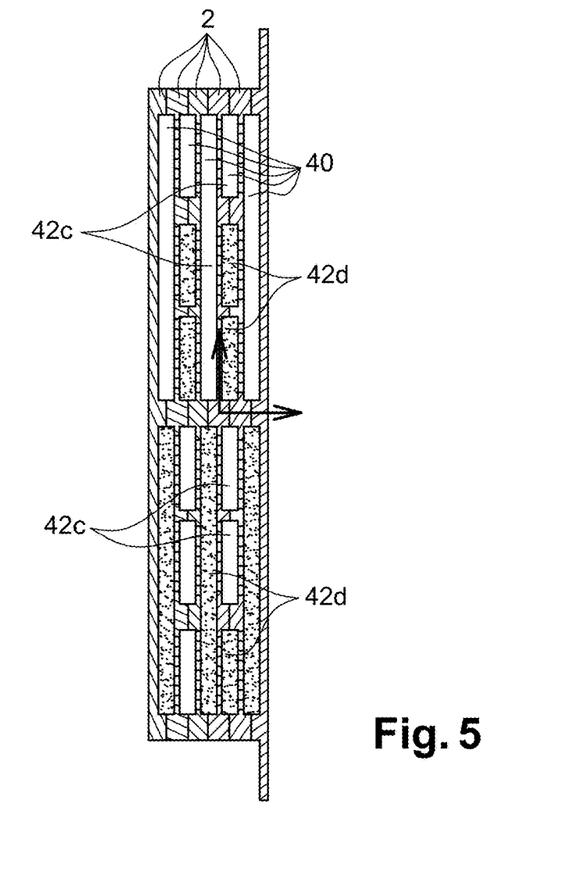
FIG. 5 is a sectional view along the line I-I of FIG. 4.

Advantageously, as illustrated in FIGS. 3, 4 and 5, the inner wall(s) 44 of two consecutive multi-fluid intermediate spaces 40 in the stacking direction E is transversely offset relative to each other, that is to say in the plates 2 plane. In particular, these inner walls 44 may extend according to different trajectories. In other words, the inner wall(s) 44 of these two consecutive multi-fluid intermediate spaces 40 are not superimposed, which allows creating overlapping areas which are suitable for a heat exchange in the stacking direction E, i.e. inter-intermediate spaces 4, 40.

Thus, as shown in FIGS. 4 and 5, the compartments 42c, 42d each intended for the circulation of a distinct fluid, may have a different shape in two consecutive multi-fluid intermediate spaces 40. From a multi-fluid intermediate spaces 40 to the other, the compartments 42c and 42d partially overlap. This enables an inter multi-fluid intermediate spaces 40 heat transfer, through the plates 2, in addition to the heat transfer occurring inside the same multi-fluid intermediate space 40 via the inner wall 44.

Figure 7:
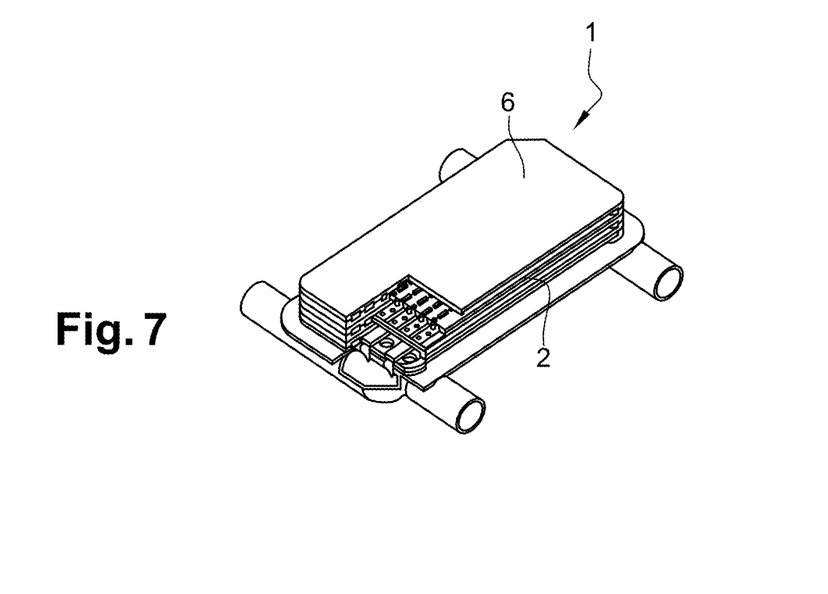
FIG. 7 is a perspective and partial sectional view of the heat exchanger of FIG. 6.
Figure 9:
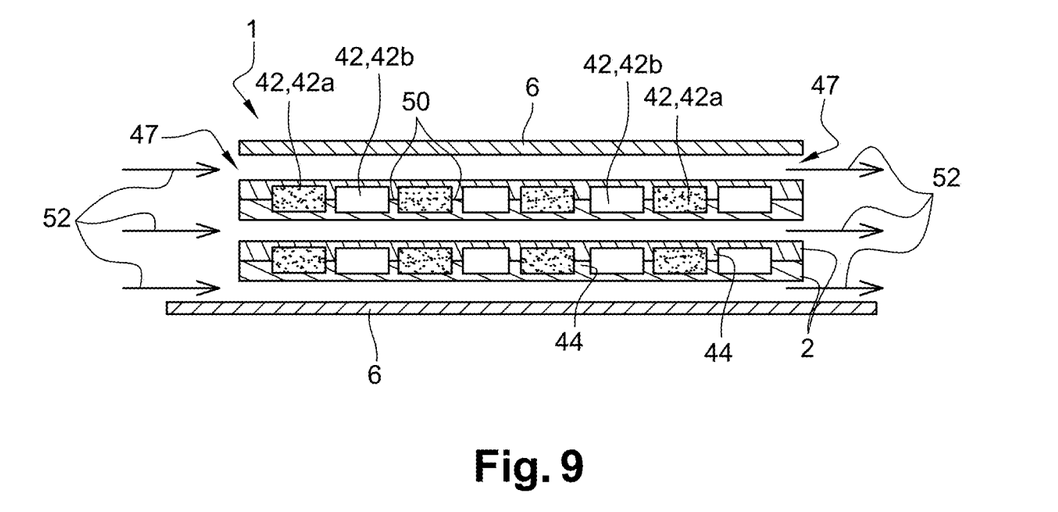
FIG. 9 is a sectional and side view of the heat exchanger of FIG. 6.

As previously indicated, the intermediate spaces 4 may be open or closed. The heat exchanger 1 may comprise in the stacking direction E an alternation of open intermediate spaces 4 and closed multi-fluid intermediate spaces 40 connected to each other, as illustrated in FIGS. 7 to 9. According to the example of FIG. 7 to 9, air or oil may actually pass through the stack of plates 2 by passing through the open intermediate spaces 4 (arrow 52). For example, the heat exchanger 1 may be positioned inside an oil sump (not shown).

Moreover, the set of intermediate spaces 4 may comprise an array of mono-fluid intermediate spaces 4 connected to each other, each mono-fluid intermediate space 4 being intended for the circulation of a single fluid between the two adjacent plates 2 which delimit it. In other words, the mono-fluid intermediate spaces 4 are free of any inner wall 44 dividing them into compartments 42, tightly separated from each other. Where appropriate, the heat exchanger 1 may have, in the stacking direction E, an alternation of mono-fluid intermediate spaces 4 and multi-fluid intermediate spaces 40, as illustrated in FIGS. 7 to 9 which show a particular case where the mono-fluid intermediate spaces 4 are open.

Figure 2:
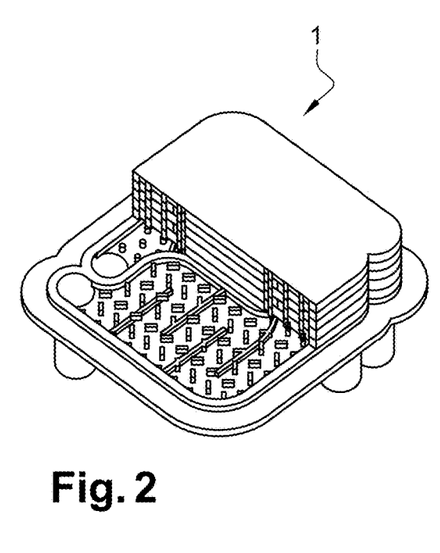
FIG. 2 is a perspective and partial section view of the heat exchanger of FIG. 1.

It should be noted that the set of intermediate spaces 4 of the heat exchanger 1 may comprise only multi-fluid intermediate spaces 40, as shown in FIGS. 1 to 3.

The intermediate spaces 40 may all be fluidly connected to each other, as shown in FIG. 3, such that at each layer of the heat exchanger 1, i.e. at each multi-fluid intermediate space 40, these same fluids circulate. According to the example of FIGS. 1 to 3, two fluids circulate through the heat exchanger 1, each fluid circulating in one of the two compartments 42 of each of the multi-fluid intermediate spaces 40, these compartments 42 being in fluid communication.

Alternatively, although not shown, the set of intermediate spaces 4 may comprise a first group of multi-fluid intermediate spaces 40 in fluid communication, and a second group of multi-fluid intermediate spaces 40 in fluid communication. Thus, the first group of multi-fluid intermediate spaces 40 enables the circulation of a first group of fluids in the heat exchanger 1, and the second group of multi-fluid intermediate spaces 40 enables the circulation of a second group of fluids in the heat exchanger 1. The heat exchanger 1 may have in the stacking direction E an alternation of multi-fluid intermediate spaces 40 of the first group and multi-fluid intermediate spaces 40 of the second group. This enables a heat exchange between the fluids of the first group and the fluids of the second group.

According to a possibility, the plurality of openings 12 or, where appropriate, the dispensing channels 14 may be configured to dispense fluids in an alternating manner in the compartments 42 of the same multi-fluid intermediate space 40. Thus, according to the example of FIGS. 8 and 9, each multi-fluid intermediate space 40 may comprise a first group of compartments 42a intended for the circulation of the same fluid (arrow 54) among the fluids circulating through this multi-fluid intermediate space 40, a second group of compartments 42b intended for the circulation of the same other fluid (arrow 56) among the fluids circulating through this multi-fluid intermediate space 40, and the compartments 42a of the first group are disposed in an alternating manner with the compartments 42b of the second group. In this instance, the inlet openings 18 of the compartments 42a of the first group, respectively the second group, open into the same dispensing channel 14, as well as their outlet openings 20.

Although not shown, the plurality of openings 12 or, where appropriate, the dispensing channels 14 may be configured to dispense fluids into the alternating compartments 42 of two adjacent multi-fluid intermediate spaces 40. Continuing with the example of FIG. 9, the compartments 42a of the first group could be arranged above or below a compartment 42b of the second group. This alternating arrangement improves the efficiency of the heat exchanger.

The object of the invention is also a vehicle, in particular a motor vehicle, comprising a heat exchanger 1 having all or part of the previously described features.

Of course, the invention is not limited to the above-described embodiment, this embodiment having been given only as example. Modifications are possible, in particular with regards to the constitution of the various devices or by substitution with technical equivalents, yet without departing from the scope of the invention.

The invention claimed is:

1. A heat exchanger, made of plastic material, comprising a stack of plates, wherein adjacent plates of the stack of plates are spaced from each other such that the stack of plates has a set of intermediate spaces enabling fluid circulation between adjacent plates of the stack of plates,
wherein the set of intermediate spaces comprises a plurality of multi-fluid intermediate spaces, each multi-fluid intermediate space of the plurality of multi-fluid intermediate spaces allowing for circulation of a plurality of fluids between two adjacent plates of the stack of plates, each of the plurality of multi-fluid intermediate spaces being partitioned into a plurality of compartments separated from each other, each compartment of the plurality of compartments being configured for circulation of one fluid of the plurality of fluids, and each compartment of the plurality of compartments being in fluid communication with one of the plurality of compartments of a distinct multi-fluid intermediate space of the plurality of multi-fluid intermediate spaces.

2. The heat exchanger according to claim 1, wherein each multi-fluid intermediate space of the plurality of multi-fluid intermediate spaces comprises an inner wall extending therethrough so as to separate at least two adjacent compartments of each multi-fluid intermediate space of the plurality of multi-fluid intermediate spaces, and the inner wall is configured to enable heat exchange between fluids circulating in the at least two adjacent compartments of each multi-fluid intermediate space of the plurality of multi-fluid intermediate spaces.

3. The heat exchanger according to claim 2, wherein the inner wall extends at least partially according to a sinuous trajectory.

4. The heat exchanger according to claim 3, wherein the inner wall is integrally molded with at least one of two adjacent plates of the stack of plates between which the inner wall extends.

5. The heat exchanger according to claim 4, wherein the inner wall is linked to at least one of two adjacent plates of the stack of plates by a sealed and thermally conductive linking element.

6. The heat exchanger according to claim 5, wherein the inner wall has a thickness smaller than the thickness of the two adjacent plates of the stack of plates between which the inner wall extends.

7. The heat exchanger according to claim 6, wherein the inner wall of two consecutive multi-fluid intermediate spaces of the plurality of multi-fluid intermediate spaces extend offset from each other.

8. The heat exchanger according to claim 7, wherein several plates of the stack of plates have different thicknesses and/or densities.

9. The heat exchanger according to claim 8, wherein each compartment of the plurality of compartments are at least partially defined by opposing faces of two adjacent plates of the stack of plates.

10. The heat exchanger according to claim 9, wherein at least one of the plurality of compartments comprises a plurality of elements for hindering fluid flow in the at least one of the plurality of compartments, and wherein the plurality of elements are thermally conductive.

11. The heat exchanger according to claim 3, wherein the inner wall is linked to at least one of two adjacent plates of the stack of plates by a sealed and thermally conductive linking element.

12. The heat exchanger according to claim 2, wherein the inner wall is integrally molded with at least one of two adjacent plates of the stack of plates between which the inner wall extends.

13. The heat exchanger according to claim 12, wherein the inner wall is linked to the at least one of two adjacent plates of the stack of plates by a sealed and thermally conductive linking element.

14. The heat exchanger according to claim 2, wherein the inner wall is linked to at least one of two adjacent plates of the stack of plates by a sealed and thermally conductive linking element.

15. The heat exchanger according to claim 2, wherein the inner wall has a thickness smaller than the thickness of two adjacent plates of the stack of plates between which the inner wall extends.

16. The heat exchanger according to claim 2, wherein the inner wall of two consecutive multi-fluid intermediate spaces of the plurality of multi-fluid intermediate spaces extend offset from each other.

17. The heat exchanger according to claim 1, wherein several plates of the stack of plates have different thicknesses and/or densities.

18. The heat exchanger according to claim 1, wherein each compartment of the plurality of compartments are at least partially defined by opposing faces of two adjacent plates of the stack of plates.

19. The heat exchanger according to claim 1, wherein at least one of the plurality of compartments comprises a plurality of elements for hindering fluid flow in the at least one of the plurality of compartments, and wherein the plurality of elements are thermally conductive.

20. A vehicle comprising a heat exchanger according to claim 1.

* * * * *